Nov. 14, 1933.  M. C. JEAN ET AL  1,935,505
LIQUEFACTION AND SEPARATION OF GASEOUS MIXTURES AT LOW TEMPERATURES
Filed Nov. 28, 1927
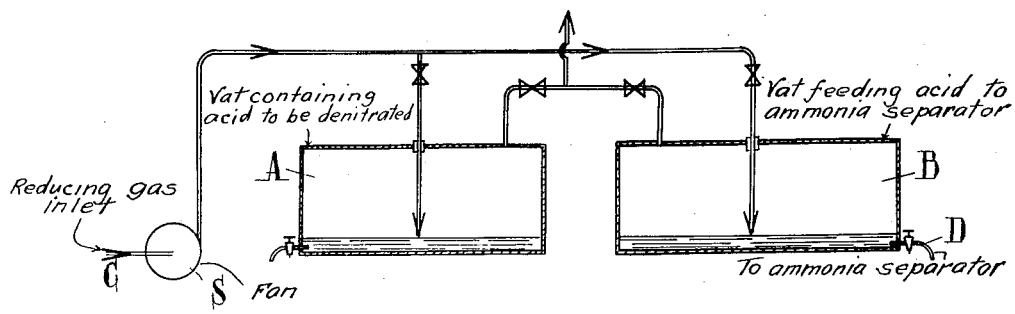
INVENTOR:
Marcel Charles Jean
and Pascal Matile
By
ATTORNEY Patented Nov. 14, 1933

1,935,505

UNITED STATES PATENT OFFICE 1,935,505

LIQUEFACTION AND SEPARATION OF GASEOUS MIXTURES AT LOW TEMPERATURES

Marcel Charles Jean and Pascal Matile, Paris, France, assignors to Société L'Air Liquide Société Anonyme Pour L'Etude & L'Exploitation des Procédés Georges Claude, Paris, France Application November 28, 1927, Serial No. 236,274, and in France December 4, 1926

10 Claims. (Cl. 23—2)

The present invention relates to improvements in methods of liquefying and separating gaseous mixtures at low temperatures for the purpose, for example, of manufacturing hydrogen by partial liquefaction of commercial gaseous mixtures containing it, such as coke oven and illuminating (coal) gas, etc., as well as of manufacturing oxygen and nitrogen by liquefaction of air. Coke oven gas, illuminating gas and air are mentioned here by way of example. It should be understood that the process is generally applicable in the total or partial liquefaction of all gases the critical point of which lies below about 0° C., and which were formerly called "permanent gases", these so-called "permanent gases" being or not admixed with other gaseous components either more or less volatile than themselves.

According to this invention, it has been found that for such treatment at a low temperature it is absolutely necessary to prevent the presence of any nitrogen oxides in the gaseous mixture under treatment. It has been ascertained that such compounds deposit in the cooler parts of the apparatus, in regions wherein certain hydrocarbons, for instance, acetylene, also become deposited, and that said compounds are liable, either alone or in combination with such hydrocarbons, to yield unstable products which may cause explosions.

Consequently, and in accordance with the present invention, the gaseous mixture under treatment is to be freed from practically all the nitrogen oxides which it may contain, for instance, by being subjected to bright red heat, a temperature at which said compounds divide into nitrogen and oxygen. Since the elimination of the nitrogen oxides may take place by decomposing them, it appears that this invention does not purpose to recuperate these nitrogen oxides. Moreover it would not have been worth while recuperating them, since their proportion practically never exceeds 1/1000 and is usually comprised, in the case of coke oven gas, between one and ten parts in volume per one million parts of the treated gaseous mixture.

It is to be noted that, in the case of coke oven gases or illuminating gas, the nitrogen oxides may result from the fact that the sulphuric acid used to remove the ammonia from said gases in the saturators frequently contains nitrogen oxides in the form of acid nitrosyl sulphate or analogous products. Such an acid, when introduced into an ammonia saturator, is then in the presence of a liquid, which dilutes it and thereby produces a decomposition of the nitrosyl sulphate with liberation of nitrogen oxides. Said compounds are also formed through the action of reducing agents on nitrosyl sulphate, for instance, sulphuretted hydrogen, which are contained in coal gas. The thus formed compounds are carried away by the gas beyond such saturators and must be prevented, according to the present invention, from reaching the apparatus that produces hydrogen by partial liquefaction.

One way of avoiding, in this case, the presence of nitrogen oxides consists, according to the present invention, in denitrating the sulphuric acid used for the ammonia recovery by causing a suitable reducing gas to bubble through said acid. In coke plants and gas works, there can be advantageously employed for this purpose a portion of the raw coal gas, which fraction is then not used for liquefaction since it is charged with the nitrogen oxides to be eliminated. There can also be used reducing gases charged with sulphuretted hydrogen obtained from the distillation of the ammoniacal liquors of the coke plant or from the ammoniacal solutions used for chemically purifying the gas previous to liquefying the same.

As an example, denitration of sulphuric acid may be effected in a continuous manner by causing, by means of fans, the reducing gas to bubble and circulate through sulphuric acid fed in a continuous manner into a vat which is placed at a higher level than the ammonia saturator whereinto the denitrated acid is led afterwards. It has, however, been found that more regular and, above all, more accurately controllable results are obtained by using, instead of the foregoing device, a discontinuous arrangement such as that illustrated diagrammatically, and by way of example, in the drawing appended hereto.

In this arrangement, two acid vats A and B are used, one of said vats serving for the denitration of the acid while the other vat contains the denitrated acid wherewith the ammonia saturator is fed, and vice versa. Said vats A and B are connected through a suitable system of piping and valves with the inlet C of the reducing gas. For instance, the valves may be so arranged that the reducing gas from a fan S will be admitted into vat A containing the acid to be denitrated and that vat B will receive no gas but will at this moment feed the ammonia saturator through valve D.

The reducing gas is caused to bubble in vat A until analysis shows no nitrogen oxides in the acid. At that time vat B will have completely discharged its acid, so that the valves are then operated to let clean acid flow from vat A to the saturator and to cause the reducing gas to be now led into vat B as well as the acid to be denitrated. This discontinuous device is generally preferable because it permits of absolutely strict control, which is absolutely essential in the case under consideration.

It should be noted that the treatment of denitrated acid by means of the sulphuretted hydrogen contained in reducing gases causes a precipitation of sulphur and of certain impurities such as arsenic which can be separated by filtering or decanting, while the acid so purified can yield an ammonia sulphate purer and whiter than the one usually manufactured in coke oven plants.

There will now be disclosed a means for obtaining the elimination of nitrogen oxides in the case where the gases under treatment contain reducing gases, especially hydrogen, that are in large proportion in respect to the nitrogen oxides referred to. It has been found that in such a case, practically complete elimination of nitrogen oxides is effected by hydrogenating said oxides in the presence of reduced metals and at temperatures lower than the temperatures at which said oxides can be hydrogenated when they are contained in very large amounts in the gas under treatment.

For instance, in the presence of reduced copper a temperature of about 100° C. is sufficient, while, in the presence of reduced iron, a temperature of 125° C. is adequate. It has been ascertained, furthermore, that, under said conditions and subject to suitable temperature, not only the nitrogen oxides present in the gases are eliminated but there takes place at the same time a hydrogenation of any acetylene that may be contained also in the gases treated. Although hydrogenation of nitrogen oxides is more readily obtained than hydrogenation of acetylene when each of those bodies is treated alone, it has been found that both hydrogenations are parallelly effected on one and the same catalyst. With reduced iron the temperature should be about 200° C. in order to accomplish practically complete and simultaneous hydrogenation of nitrogen oxides and of acetylene.

It has been noticed that if the gaseous mixture under treatment contains carbon monoxide and ethylene, the latter is practically not hydrogenated. In such a case, ethylene may be recovered in the liquefaction apparatus and subsequently used for manufacturing alcohol.

*Example*.—Coke oven gas, purified by any usual process and compressed or not, is caused to pass over reduced copper heated to temperatures below 200° C., the temperature being governed by the condition of the catalyst. It is found that after this treatment the gas contains practically no nitrogen oxide or acetylene.

Another method for eliminating nitrogen oxides consists in putting the gas, at a high temperature, into contact with an ammonia sulphate solution which, in such conditions, will cause nitrogen to be liberated with a formation of sulphuric acid.

The above described hydrogenation process, by which nitrogen oxides and acetylene are simultaneously removed, is especially valuable when the removal of all or part of the acetylene in the gaseous mixture is desired in order to avoid trouble in the liquefaction apparatus caused by obstruction due to solid acetylene deposits which may escape the dissolving action exerted on the acetylene by any ethylene which may be condensed in the liquefaction apparatus. At the same time there is avoided the danger of explosions which may be due either to said solid acetylene, or to metallic acetylides formed by it in the apparatus or to compounds of addition or combination which it may form with other products such as the nitrogen oxides.

We claim as our invention:

1. The process of treating a gas the critical point of which lies below 0° C. and which is admixed with nitrogen oxides in a proportion of at most 1/1000 part by volume of nitrogen oxides for one part of the treated gas, which comprises successively freeing said gas from its nitrogen oxides and bringing about its liquefaction.

2. The process of treating a gas the critical point of which lies below 0° C. and which contains less than 1/1000 part by volume of nitrogen oxides, which comprises successively depriving a liquid containing nitrogen oxides from said nitrogen oxides, washing said gas with said liquid and bringing about the liquefaction of said gas.

3. The process of treating a gas the critical point of which lies below 0° C. and which contains less than 1/1000 part by volume of nitrogen oxides, which comprises successively depriving sulphuric acid containing nitrogen oxides from said nitrogen oxides, washing said gas with said sulphuric acid and bringing about the liquefaction of said gas.

4. The process of treating a gas the critical point of which lies below 0° C. and which contains less than 1/1000 part by volume of nitrogen oxides which comprises successively treating sulphuric acid which contains nitrogen oxides with reducing gases, washing the gas to be treated with said sulphuric acid and bringing about the liquefaction of said gas.

5. The process of treating a gas the critical point of which lies below 0° C. and which contains less than 1/1000 part by volume of nitrogen oxides, which comprises successively treating sulphuric acid which contains nitrogen oxides with sulphuretted hydrogen, washing the gas to be treated with said sulphuric acid and bringing about the liquefaction of said gas.

6. The process of treating a gas the critical point of which lies below 0° C. and which is admixed with unsaturated hydrocarbons and nitrogen oxides in a proportion of at most 1/1000 part by volume of nitrogen oxides for one part of the treated gas, which comprises successively freeing said gas from its nitrogen oxides and bringing about its liquefaction.

7. The process of treating a gas the critical point of which lies below 0° C. and which is admixed with acetylene and nitrogen oxides in a proportion of at most 1/1000 part by volume of nitrogen oxides for one part of the treated gas, which comprises successively freeing said gas from its nitrogen oxides and bringing about its liquefaction.

8. The process of treating a gas the critical point of which lies below 0° C. and which contains unsaturated hydrocarbons and less than 1/1000 part by volume of nitrogen oxides, which comprises successively depriving a liquid containing nitrogen oxides from said nitrogen oxides, washing said gas with said liquid and bringing about the liquefaction of said gas.

9. The process of treating a gas the critical point of which lies below 0° C. and which contains acetylene and less than 1/1000 part by volume of nitrogen oxides, which comprises successively depriving a liquid containing nitrogen oxides from said nitrogen oxides, washing said gas with said liquid and bringing about the liquefaction of said gas.

10. The process of treating coke oven gas, which comprises successively freeing said gas from its nitrogen oxides and subjecting it to liquefaction.

MARCEL CHARLES JEAN.
PASCAL MATILE.